United States Patent [19]

Asano et al.

[11] Patent Number: 4,974,940
[45] Date of Patent: Dec. 4, 1990

[54] LIQUID CRYSTAL DISPLAY DEVICE

[75] Inventors: Kazuo Asano; Toru Terasaka; Shinich Nishi, all of Hachioji, Japan

[73] Assignee: Konica Corporation, Tokyo, Japan

[21] Appl. No.: 347,377

[22] Filed: May 3, 1989

[30] Foreign Application Priority Data

May 7, 1988 [JP] Japan ................................ 63-109893

[51] Int. Cl.$^5$ ................................................ G02F 1/13
[52] U.S. Cl. .................................. 350/347 E; 350/337; 350/340
[58] Field of Search ................... 350/346, 347 E, 337, 350/340

[56] References Cited

U.S. PATENT DOCUMENTS

| | | | |
|---|---|---|---|
| 4,497,542 | 2/1985 | Kaye | 350/347 E X |
| 4,653,865 | 3/1987 | Kando et al. | 350/346 |
| 4,693,562 | 9/1987 | Hasegawa et al. | 350/337 |
| 4,759,612 | 6/1988 | Nakatsuka et al. | 350/337 |
| 4,789,508 | 12/1988 | Vinet et al. | 350/347 E X |

OTHER PUBLICATIONS

M. Schadt et al., "Electrop-Optical Performance of a New Black-White and Highly Multiplexable Liquid Crystal Display", Applied Physics Letter 50(5) (Feb. 2, 1989) pp. 236-238.

T. J. Scheffer et al., "Accurate Determination of Liquid-Crystal Tilt Bias Angles", Journal of Applied Physics, vol. 48, No. 5 (May, 1977), pp. 1783-1792.

H. Gruler et al., "Elastic Constants of Nematic Liquid Crystals", Institute fur Angewandte Festkorperphysik (1972), pp. 966-976.

H. J. Deuling, "Deformation of Nematic Liquid Crystals in an Electric Field", Molecular Crystals and Liquid Crystals, vol. 19 (1972), pp. 123-131.

W. Watanabe et al., "Full-Color LCD with Neutralized STN (NTN)", Seiko Epson Corporation SID Digest, (1988), pp. 416-419.

Primary Examiner—Stanley D. Miller
Assistant Examiner—Huy K. Mai

Attorney, Agent, or Firm—Finnegan, Henderson, Farabow, Garrett, and Dunner

[57] ABSTRACT

A liquid crystal display device consisting essentially of a liquid crystal cell and a pair of the polarizing plates disposed on the both sides of said liquid crystal cells is disclosed. The liquid crystal cell has a liquid crystal layer in which a nematic liquid crystal containing an optically active substance and forming a twisted structure is disposed between a pair of the electrode substrates being oppositely disposed and each having an alignment layer, wherein a pretilt angle $\theta_0$ made by a director of liquid crystal molecules contacting a face of the electrode substrate and the electrode substrate itself is less than 25°. Further, the liquid crystal display device is characterized by satisfying Conditions (a) to (d);

Condition (a): a twist angle $\alpha$ of the twisted structure in the liquid crystal layer is 220° to 300°;

Condition (b): a product, $\Delta n \cdot d$, of a refractive anisotropy $\Delta n$, of the nematic liquid crystal and a thickness, d, of the liquid crystal layer is 0.60 to 0.85 μm;

Condition (c): in the relation to the twist angle $\alpha$, angles $\beta$ and $\gamma$ made by polarizing axes of a pair of the polarizing plates and the directions of aligning treatments of the electrode substrates adjacent to the respective polarizing plates satisfy Equation (1);

$$\alpha + \beta - \gamma - 180° = 90° - \delta \qquad \text{Equation (1)}$$

$$0° < \delta < 40°$$

Condition (d): a spontaneous twist pitch Ps of the nematic liquid crystal containing the optically active substance and a compulsive twist pitch Pc of the liquid crystal layer in which the twisted structure is forcibly regulated by the alignment layer satisfy Equation (2);

$$(Pc - Ps)/Ps < 0 \qquad \text{Equation (2)}$$

and, in the relation to the twist angle $\alpha$, the distortion angle $\beta$ satisfies Equation (3);

$$\beta = (360 - \alpha)/2 - \delta/2 \qquad \text{Equation (3).}$$

9 Claims, 5 Drawing Sheets

LIQUID CRYSTAL DISPLAY DEVICE

FIELD OF THE INVENTION

This invention relates to a liquid crystal display device having a large display capacity and a high contrast, which has a simple structure, and is applicable to a color display device.

BACKGROUND OF THE INVENTION

A liquid crystal display device of a supertwisted biregringence effect type (the SBE type) have so far been disclosed as a liquid crystal display device capable of providing a high contrast and a large display capacity in multiplex driving at a high duty ratio.

However, a liquid crystal display device this SBE type has a defect that both areas of a displayed image and a background are tinted with a specific color, because a birefringence effect is utilized, and this defect causes the problems of: (1) poor quality of display image: (2) no flexibility to meet the colors requested by users: and (3) difficulty in displaying a full color image.

To solve the above-mentioned tinting problem and provide a clear black-and-white display, the following techniques have been proposed; (1) OMI mode where tinting is prevented in such a way that a product, $\Delta n.d$, of a reflective anisotropy, $\Delta n$, of a liquid crystal and a liquid crystal layer thickness, d ($\mu$m), is set at 0.4 to 0.6 $\mu$m, (Appl. Phys. Lett., 50 (1987), pp. 236–238) (2) a double layer cell mode where a double layer cell structure is formed by superposing one liquid crystal cell on another cell containing a reversely twisted structure in a liquid crystal layer in order to prevent tinting by utilizing the another cell as an optical compensator (Nikkei Micro-Device, October, 1987 Issue, pp. 84–88).

However, such as OMI mode as proposed by the above technique (1) has the problems: a high contrast can not be obtained; a displayed image is dark: and tinting can not completely be prevented.

Also, the foregoing double layer cell mode (2) has the problems: a production cost becomes higher and a weight of the device becomes heavier than that of a device composed of a single liquid crystal cell: and because difficulty to make the thicknesses of two liquid crystal cells uniform, the liquid crystal cell does not satisfactorily function as an optical compensator, so that it is difficult to completely prevent tinting.

In addition to the above, the SBE type liquid crystal display device requires an alignment layer providing a high pretilt angle in order to form a stable alignment and to obtain a high contrast. As for a method of forming an alignment layer providing a high pretilt angle, an oblique evaporation-deposition method is known. However, this method has the problems in a mass-productivity and a uniform processability of large area. Recently, there have been proposed several rubbing methods where a high pretilt angle can be provided with an excellent mass-productivity. In this method, however, the possible pretilt angle with a uniform alignment is 25° at most. A liquid crystal display device giving a pretilt angle of less than 25° has not been able to provide any satisfactory contrast in multiplex driving at a high duty ratio.

SUMMARY OF THE INVENTION

This invention has been made based upon the above-mentioned circumstances.

It is, therefore, an object of the invention to provide a liquid crystal display device with a simple structure, which is capable of providing a clear a display image with a high contrast and less tinting, and also is capable of providing a high purity color display in combination with a color filter in multiplex driving at a high duty ratio, while reducing its production cost.

| wherein, | 11, 12 | Electrode substrates, |
|---|---|---|
| | 11A, 12A | Support plates |
| | 11B, 12B | Electrode layers, |
| | 11C, 12C | Alignment layers, |
| | 20 | Liquid crystal layer, |
| | 30, 31 | Liquid crystal cells, |
| | 32 | Nematic liquid crystal, |
| | 41, 42 | Polarizing plates, |
| | 51, 52 | Alignment layers, |
| | 61, 72 | Spacers, and |
| | 71 | Sealing |

DETAILED DESCRIPTION OF THE INVENTION

For achieving the above-mentioned objects, a liquid crystal display device of the invention comprises a liquid crystal cell having a liquid crystal layer where a nematic liquid crystal containing an optically active substance and forming a twisted structure is disposed between a pair of the electrode substrates being oppositely disposed and each having an alignment layer, and a pair of the polarizing plates disposed on the both sides of the liquid crystal cells, wherein an angle (a pretilt angle) $\theta_0$ made by a director of a liquid crystal contacting a surface of an electrode substrate and the electrode substrate itself is less than 25°, and the liquid crystal display device is characterized by satisfying the following conditions (a) to (d);

Condition (a): in a twisted structure of a liquid crystal layer, a twist angle $\alpha$ is 220° to 300°, Condition (b): the product, $\Delta n.d$, of a reflective anisotropy $\Delta n$, of a nematic liquid crystal and a liquid crystal layer thickness, d ($\mu$m), is 0.60 to 0.85 $\mu$m.

Condition (c): in the relation to a twist angle $\alpha$, the angles $\beta$ and $\gamma$ made by the polarizing axes of a pair of the polarizing plates and the directions of aligning treatments of the electrode substrates adjacent to the respective polarizing plates satisfy the following equation (1);

$$\alpha + \beta - \gamma - 180° = 90° - \delta \quad 0° < \delta < 40° \quad \text{Equation (1)}$$

Condition (d): a spontaneous twist pitch Ps of a nematic liquid crystal containing an optically active substance, and a compulsive twist pitch Pc of a liquid crystal layer where a twisted structure is forcibly regulated by an alignment layer satisfy the following equation (2);

Equation (2): $(Pc - Ps)/Ps < 0$

In relation to the twist angle $\alpha$, it is preferable that the angle $\beta$ also satisfies the following equation (3);

$$\beta = \frac{360° - \alpha}{2} - \frac{\delta}{2} \qquad \text{Equation (3)}$$

Now, the invention will be detailed below.

When carrying out an additive color mixture display by combination of a black-and-white liquid crystal display device and red (R), green (G) and blue (B) color filters, the liquid crystal display device is usually required to satisfy the following conditions for achieving a high purity color display;
(1) in a bright state (a) light transmissive state), all rays of three wavelength regions, red, green and blue, are equally transmitted, (2) contrast in an ON/OFF state is sufficiently high in the wavelength regions of red, green and blue.

Figure 1:
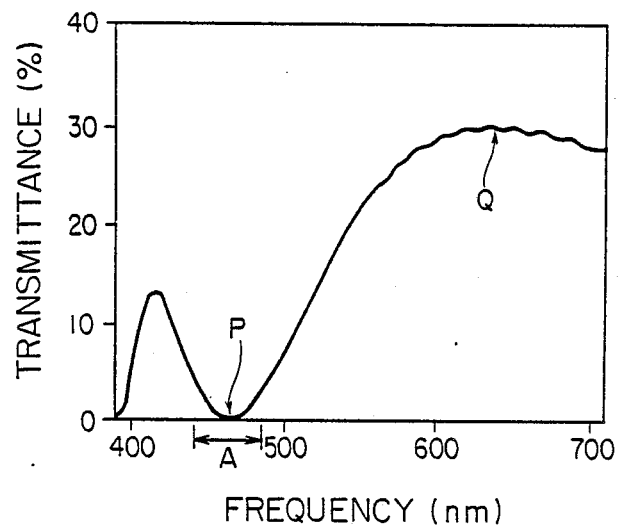
FIG. 1 shows a transmission spectrum in a conventional liquid crystal display device.

The inventors studied the causes of tinting in a bright state in a liquid crystal display device having a conventional SBE type liquid crystal cell, and found that a transmittance spectrum of a liquid crystal display device of this type has a non-transmittance wavelength region A where almost no light can be transmitted in a visible wavelength region in the bright state, as shown in FIG. 1.

The above-mentioned non-transmissive wavelength region A is shifted to a shorter wavelength when reducing a product $\Delta n.d$ of a reflactive anisotropy $\Delta n$ of a nematic liquid crystal and a thickness d of a liquid crystal layer in a liquid crystal cell.

However, an excessively small product $\Delta n.d$ results in lower light transmittance in overall visible wavelength regions and therefore, results in a darker displaying in the bright state.

After the inventors continued the studies based upon the above-mentioned findings, they found the facts that non-transmissive wavelength region A can be shifted to a UV region and tinting can be prevented by setting the above-mentioned product $\Delta n.d$ at a range of not more than 0.85 $\mu$m and not less than 0.60 $\Delta$m, {Condition (b)} while a light transmittance can satisfactorily be maintained in the overall visible wavelength regions and much brighter display can be achieved in the bright state.

In the invention, it is particularly preferable that a value of $\Delta n.d$ is 0.7 to 0.85.

Further studies showed that shift of the angles $\beta$ and $\gamma$ of a pair of the polarizing plates disposed on the both sides of the liquid crystal cells affects the transmittances in a minimum point P and a maximum point Q of the transmittance spectrum shown in FIG. 1. To be more concrete, it was found that, the transmittance in the minimum point P increases gradually by changing a value of $\beta + \gamma$ from 90° to 0°, while the transmittance in the maximum point Q decreases gradually by increasing the difference of the absolute values of the angles $\beta$ and $\gamma$.

Therefore, the suitably adjusted angles $\beta$ and $\gamma$ can make a transmittance spectrum flatter and thereby prevent tinting. In practice, however, it is difficult to completely level a transmittance spectrum only by changing the angles $\beta$ and $\gamma$, and therefore, it is preferable to use a filter for levelling the transmittance spectrum, or to select a suitable light source so as to correct the transmittance spectrum, if necessary.

In the meantime, it is necessary for increasing the contrast of an image displayed to depress light leakage in a dark state (a non-light transmissive state). Particularly, in the case of a color display using three color filters of red, green and blue, it is required to minimize light leakage as much as possible in order to improve color purity.

In this respect, conventional SBE type liquid crystal display device having a pretilt angle $\theta_0$ of less than 25° provides a contrast of 15 at most in multi-plex driving at a duty ratio of 100/100, and this level of the contrast is still insufficient for color display.

Accordingly, the inventors studied further with a purpose of obtaining a liquid crystal display device having a contrast of not lower than 20 so as to make more excellent color display, and discovered that in the case of using a liquid crystal cell having a nematic liquid crystal layer with a twisted structure and a pair of the polarizing plates in combination, and of fixing the angle $\beta$ of one polarizing plate, the following equation (1) can determine the angle $\gamma$ of the other polarizing plate in relation to the twist angle $\alpha$ of the liquid crystal layer so as to minimize a transmittance in a dark state;

$$\alpha + \beta - \gamma - 180° = 90° - \delta \qquad \text{Equation (1)}$$

wherein $0° < \delta < 40°$.

In the above-given Equation (1), when selecting the angles $\beta$ and $\gamma$ in relation to the twist angle $\alpha$, a transmittance in the dark state can be minimized, so that a light leakage in the dark state can be reduced, which results in making a contrast higher.

The above-given value of $\delta$ depends on an average tilt angle $\theta^{ON}$ of the liquid crystal molecules in a nematic liquid crystal layer in the dark state, (a non-light-transmissive state when applying an ON-voltage). The more the average tilt angle $\theta^{ON}$ approaches 90°, the closer the value $\delta$ is to 0°. The term 'an average tilt angle $\theta^{ON}$' means an average tilt angle along a thickness direction of a liquid crystal layer, which is made by a director of liquid crystal molecules and a surface of an electrode substrate. This average tilt angle $\theta^{ON}$ depends on the kinds of an aligment layer, the physical properties of nematic liquid crystals and a level of an ON-voltage.

Figure 2:
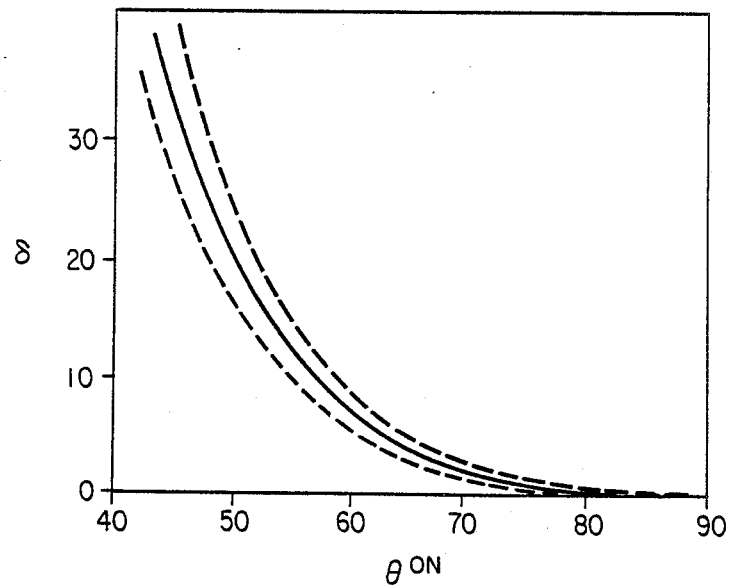
FIG. 2 is graph illustrating a relation between an average tilt angle $\theta^{ON}$ in applying an ON voltage and $\delta$.

In the above-given Equation (1), the value of the left side is equivalent to an angle made by the polarizing axes themselves of a pair of the polarizing plates. Accordingly, if the liquid crystal molecules in a liquid crystal layer are completely aligned to the direction of an electric field in applying an ON voltage ($\theta^{ON} = 90°$), a light leakage in the dark state is minimized, provided the value on the left side of the equation is equivalent to 90°. In practice, however, the liquid crystal molecules of the liquid crystal layer are not completly aligned in a vertical direction ($\theta^{ON} < 90°$) in applying an ON voltage, and therefore, the liquid crystal layer shows some retardation against incident light. It was found that in order to minimize a light leakage the value on the left side of Equation (1) should be shifted from 90° by a correction angle $\delta$ according to an average tilt angle $\theta^{ON}$ so as to offset an optically active effect produced by the retardation. A shifting direction should be such that the value $\delta$ is positive. FIG. 2 shows the relation between the value $\delta$ and the average tilt angle $\theta^{ON}$ in applying an ON voltage.

In FIG. 2, the solid line shows the relation between the average tilt angle $\theta^{ON}$ in applying an ON voltage and the value $\delta$ in $\Delta n.d$ of 0.77 $\mu m$. The broken lines show the range in which the relation indicated by the solid line shifts in $\Delta n.d$ ranging from 0.60 to 0.85.

The average tilt angle $\theta^{ON}$ can not be easily measured in practice, but can be estimated by measuring a retardation shown by a liquid crystal cell. The average tilt angle $\theta^{ON}$ is proportional to the pretilt angle $\theta_0$, provided the degrees of bistability shown by the liquid crystal cells are almost the same.

Further studies, by the inventors revealed that the above-mentioned minimum light leakage can further be minimized, provided the angle $\beta$ is determined according to the following Equation (3);

$$\beta = \frac{360° - \alpha}{2} - \frac{\delta}{2} \qquad \text{Equation (3)}$$

When the angles $\beta$ and $\gamma$ of a pair of the polarizing plates are selected so as to satisfy the above-given Equations (1) and (3) in relation to the twist angle $\alpha$ of a liquid crystal layer in a liquid crystal cell, a contrast can be maximized.

It is possible to minimize a light leakage in a dark state in multiplex driving, provided the angles $\beta$ and $\gamma$ of a pair of the polarizing plates satisfy the above-given Equations (1) and (3). In this case, the minimum value of light leakage is determined by the average tilt angle $\theta^{ON}$ of the liquid crystal molecules in a liquid crystal layer when in the dark state in applying an ON voltage.

Figure 3:
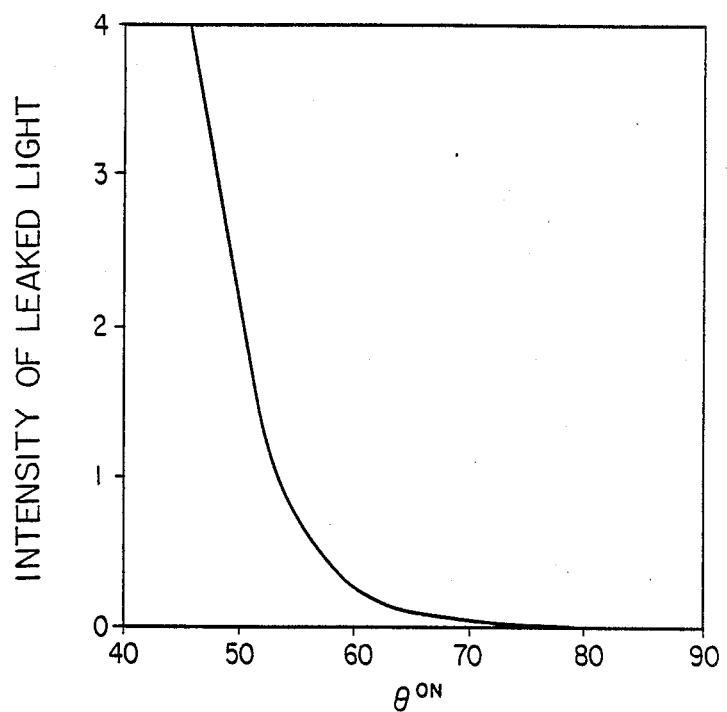
FIG. 3 is graph illustrating a relation between an average tilting angle $\theta^{ON}$ in applying an ON voltage and an intensity of leaked light.

For example, FIG. 3 shows calculated results of the relation between the minimum value of light leakage in the dark state in $\Delta n.d$ of 0.77 $\mu m$ and the average tilt angle $\theta^{ON}$. As is understandable from this figure, an average tilt angle $\theta^{ON}$ exceeding 45° in applying an ON voltage reduces light leakage, and an average tilt angle $\theta^{ON}$ of not less than 60° makes light leakage almost nil.

The average tilt angle $\theta^{ON}$ depends on a pretilt angle $\theta$, and therefore, in a liquid crystal cell having the pretilt angle of less than 25°, the liquid crystal molecules are not satisfactorily aligned vertically in applying an ON voltage, so that a light leakage becomes greater.

As the results of studying the conditions for a liquid crystal cell to satisfactorily align the liquid crystal molecules vertically in applying an ON voltage, it was found that angle $\theta^{ON}$ becomes larger when an alignment state of a liquid crystal shows a slight bistable phenomenon to a driving voltage, and the value of $(Pc-Ps)/Ps$ representing the relation between a spontaneous twist pitch Ps of a nematic liquid crystal containing an optically active substance and a compulsive twist pitch Pc of a liquid crystal layer where a twisted structure is regulated forcibly by an alignment layer, becomes smaller.

In addition to the above, it was also found that fulfilling the following Equation (2) can satisfactorily diminish a light leakage in a dark state.
Equation (2): $(Pc-Ps)/Ps < 0$ As the smaller pretilt angle 74 $_0$ makes the average tilt angle $\theta^{ON}$ smaller, it is preferable to make a value of $(Pc-Ps)/Ps$ more negative.

Figure 4:
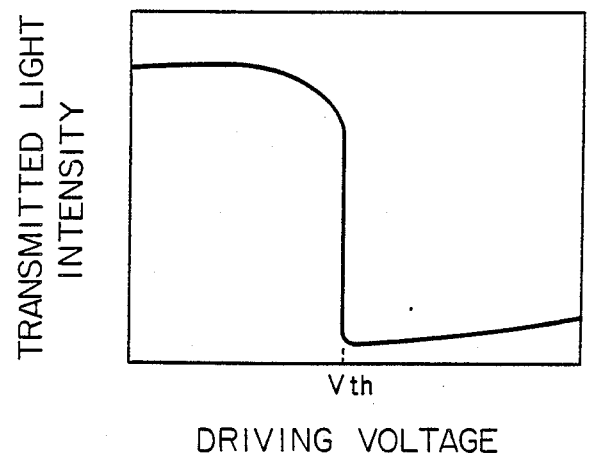
FIG. 4 is an illustration showing a bistable phenomenon.

The term 'a bistable phenomenon' means a phenomenon where, as shown in FIG. 4, a transition of alignment states accompanying a shift of a discrination line from an OFF state alignment region to an ON state alignment region is observed in a threshold voltage $V_{th}$ of a driving voltage. When this bistable phenomenon takes place, a transmitting light intensity in sweeping a driving voltage suddenly changes on a threshold voltage $V_{th}$.

In order to allow a liquid crystal cell to show a slight bistable phenomenon to a driving voltage, it is required that the twiest angle $\alpha$ of the twisted structure in a nematic liquid crystal layer is not smaller than 220°.

Figure 5:
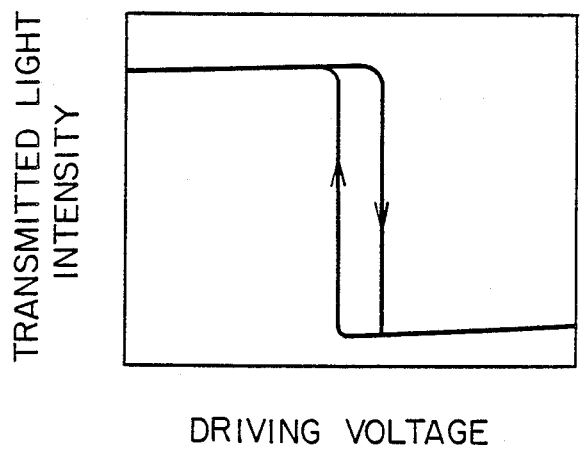
FIG. 5 an illustration showing a hysteresis of a bistable phenomenon.

As shown in FIG. 5, the too large twist angle $\alpha$ results in the layer bistable phenomenon, and a hysteresis phenomenon appears in a transmitting light intensity change to a driving voltage, by which a dark/bright response speed corresponding to ON/OFF switching of a driving voltage in multiplex driving is delayed. To accelerate the response speed, the twist angle $\alpha$ should be not more than 300°.

Further, in order to hold light leakage down in the dark state as small as possible, the following conditions are preferably satisfied;
Conditions (e): in a nematic liquid crystal, a splay elastic constant $k_{11}$ or a twist elastic constant $k_{22}$ and a bend elastic constant $k_{33}$ should satisfy at least one of the following Equations (4) and (5);
Equation (4): $K_{33}/k_{22} \geq 2.3$
Equation (5): $K_{33}/k_{11} \leq 1.5$ Applying a liquid crystal satisfying the above-given Condition (e) can increase an average tilt angle $\theta^{ON}$ in the dark state and can also diminish a light leakage.

In the foregoing Equation (1), an optimum $\delta$ value can be determined by the kind of an alignment layer and the physical property values of a liquid crystal; for the same liquid crystal, the larger the pretilt angle $\theta_0$ is, the smaller the $\delta$ value is, and the smaller the $\delta$ value is, the less the light leakage in a dark state is.

Further, the greater the bistable phenomenon of a liquid crystal cell is, the smaller the $\delta$ value is.

In a liquid crystal cell having a large optimum $\delta$ value, a light leakage in a dark state is larger, and a liquid crystal cell having an optimum $\delta$ value exceeding 40° can not provide a satisfactory contrast even if the other parameters are set at the optima.

An optimum $\delta$ value depends on a combination of the kind of an alignment layer and a liquid crystal, and therefore, has to be determined in every combination.

To be more concrete, the above-mentioned determination can be made in the following manner.

The initial values of the angles $\beta$ and $\gamma$ of a pair of the polarizing plates in a liquid crystal cell satisfying the Conditions (a), (b) and (d) are set at:
$\beta = (360° - \alpha)/2$
$\gamma = (\alpha - 180°)/2$ Next, while gradually changing $\beta$ and $\gamma$ from the initial values according to the following equations, a light leakage intensity in the dark state in applying an ON voltage is monitored to determine an optimum value $\omega_0$ of the change angle $\omega$ in which light leakage is minimized.
$\beta = (360° - \alpha)/2 - \omega$
$\gamma = (\alpha - 180°)/2 = \omega$ As is understandable from Equation (3), the value $\omega_0$ corresponds to $\delta/2$ and, therefore, a value of $\delta$ can be determined therefrom.

Once the value of $\delta$ is determined, any optimum combination of $\beta$ and $\gamma$ can be found out based on the $\delta$ value and Equation (1).

The term 'ON voltage' means an ON voltage $V_{ON}$ corresponding to an effective ON/OFF voltage ratio:

$$V_{ON}/V_{OFF} = \left(\frac{(N)^{\frac{1}{2}} + 1}{(N)^{\frac{1}{2}} - 1}\right)^{\frac{1}{2}}$$

in multiplex driving at a duty ratio of 1/N and also, means an ON voltage where a response time $t_{ON}$ for switching a bright state over to dark one and a response time $t_{OFF}$ for switching a dark state over to bright one are equalized to each other.

The following Table 1, shows the experimentally obtained values representing the relation between the pretilt angle $\theta_0$ and $\delta$ in a liquid crystal cell in which the foregoing Conditions (a), (b) and (d) are satisfied.

TABLE 1

| Pretilt angle $\theta_0$ | $\delta$ |
|---|---|
| 5° | 10 to 40° |
| 15° | 5 to 30° |
| 25° | 0 to 20° |

As shown bove, if the angles $\beta$ and $\gamma$ of the polarizing plates are set so as to satisfy both of the above-given Equations (1) and (3), a liquid crystal display device capable of providing the maximum contrast can be obtained. Meanwhile, if the angles $\beta$ and $\gamma$ are set so as to satisfy only the above-given Equation (1), and a value of $\beta+\gamma$ is varied from 90° to 0° or from 90° to 180°, brightness of a display increases in the bright state, and tinting diminishes.

Accordingly, in order to satisfy the conditions for both of the contrast and the brightness in the bright state from a practical viewpoint, the angles $\beta$ and $\gamma$ may be selected so that $\beta+\gamma$ shifts from 90° in a range satisfying the above-given Equation (1).

When the above-given Condtions (a) to (d) are satisfied, the brightness in the bright state becomes maximum, provided a twist angle $\alpha$ is around a value of 270° $-\delta$. Therefore, when such a twist angle $\alpha$ is selected, the contrast can further be raised.

Next, the other preferable conditions for practically manufacturing a liquid crystal display device relating to the invention will be detailed. (1) A liquid crystal transition temperature $T_{NI}$ from a nematic liquid crystal phase to a isotropic liquid phase is preferably not lower than 90° C. To be more concrete, selection of such a preferable condition makes it possible to depress the variations in a displayed color, a driving voltage, a response speed and the like, which are caused by a temperature change in a displayed color, within a range of a normal operation temperature, and a highly reliable liquid crystal display device can be provided. (2) A refractive anisotropy $\Delta n$ of a nematic liquid crystal is preferably not less than 0.1. Selection of such a preferable condition can make a liquid crystal cell thinner and results in remarkably shortening a time required for switching ON and OFF, so that a further more excellent response property can be provided. (3) A viscosity of a nematic liquid crystal at 20° C. is preferably not higher than 30 cp. Selection of such a preferable condition can extremely shorten a rise time of a liquid crystal display device, so that a further more excellent response property can be provided. (4) For the purpose of stabilizing a twisted structure of a liquid crystal layer and eliminating any alignment portion of a liquid crystal layer having a different twist angle, the following equation is preferably satisfied by a liquid crystal layer thickness d and a spontaneous twist pitch Ps;

$$(\alpha/360)-0.25 < d/Ps < (\alpha/360)+0.30$$

A too small d/Ps value is liable to form an alignment portion having a twist angle smaller by 180° than an intended twist angle $\alpha$: meanshile, a too large d/Ps value is liable to form an alignment portion having a twist angle larger by 180° than an intended twist angle $\alpha$. (5) A ratio, $\Delta\epsilon/\epsilon$, of a dielectric anisotropy $\Delta\epsilon$ to a dielectric constant $\epsilon$ in a direction perpendicular to a parallel axis of a liquid crystal molecule in a nematic liquid crystal is preferably not less than 1.8.

Selection of such a preferable range enables a liquid crystal display device to satisfactorily perform a high multiplex driving at a low driving voltage, so that an inexpensive liquid crystal display device with less electricity consumption can be manufactured.

A too small $\Delta\epsilon/\epsilon$ value is liable to require a higher driving voltage and provide an inferior intensity change of transmitted or reflected light to an applied voltage, so that it is sometimes difficult to provide a sufficiently high contrast.

In this invention, a refractive anisotropy $\Delta n$, a splay elastic constant $k_{11}$, a twist elastic constant $k_{22}$, a bend elastic constant $k_{33}$, a dielectric anisotropy $\Delta\epsilon$, a dielectric constant $\epsilon$, a transition temperature $T_{NI}$, and a viscosity $\eta$, are the physical properties of a nematic liquid crystal containing no optically active substance. However, there scarecely exists a difference between the physical properties of a nematic liquid crystal with or without an optically active substance, because an addition amount of the optically active substance is very small.

A pretilt angle $\theta_0$ can be measured, for example, by a magneto-capacitive null method described in J. Appl. Phys. 48, p. 1783, 1977.

In the invention, the angle $\beta$ means the angle of a polarizing plate of an incident light side. The angle $\gamma$ means the angle of a polarizing plate at an outgoing light side in a transmittance type liquid crystal display device, and the angle of a polarizing plate at a reflective light side in a reflection type liquid crystal display device.

The angle of a polarizing plate means an angle made by a projection direction of a director of the liquid crystal molecules (a dominant aligning direction of parallel axes of liquid crystal molecules) contacting a surface of the electrode substrate, which is assumed to be projected on the electrode substrate, and a polarizing axis direction (a transmittance axis or an absorption axis) of a polarizing plate disposed on the electrode substrate.

The angles $\beta$ and $\gamma$ of the polarizing plate are converted to the values ranging from −90° to +90°. For example, the angle $\beta=135°$ is equivalent to the angle $\beta=-45°$.

In this connection, a projection direction of a director of the liquid crystal molecules contacting a surface of an electrode substrate, which is assumed to be projected on the electrode substrate, usually corresponds to an aligning treatment direction of an alignment layer on the electrode substrate;

an aligning treatment direction corresponds to, a rubbing direction in the case where the aligning treatment is carried out by a rubbing method.

A polarizing axis of a polarizing plate may be either a transmittance axis or an absorption axis. In the case where both of the angles $\beta$ and $\gamma$ are determined by a transmittance axis or an absorption axis, display mode becomes a normally white mode in which a state in applying an OFF voltage is light-transmissive and a state in applying an ON voltage is non-light-transmissive. A particularly high contrast can be achieved by this mode. Every description in this specification is based on the above-mentioned display mode.

In the case where either one of the angles $\beta$ and $\gamma$ is determined by a transmittance axis and the other is determined by an absorption axis, the display mode becomes a normally black mode in which a state in applying an OFF voltage is non-light-transmissive and a state in applying an ON voltage is light-transmissive. An excellent light transmissive state especially free of tinting can be achieved by this display mode.

Figure 6:
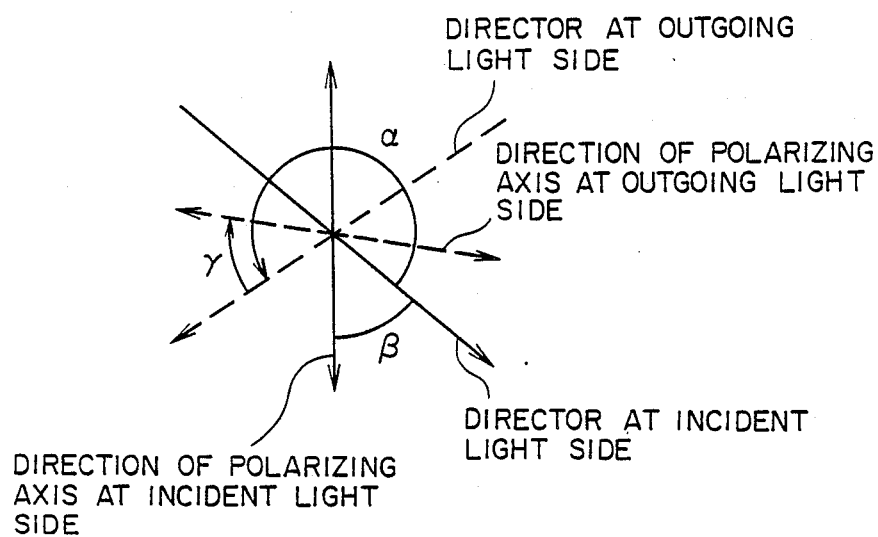
FIGS. 6 and 7 are the illustrations showing a relation between a twist angle $\alpha$ and the angle $\beta$ and $\gamma$.
Figure 7:
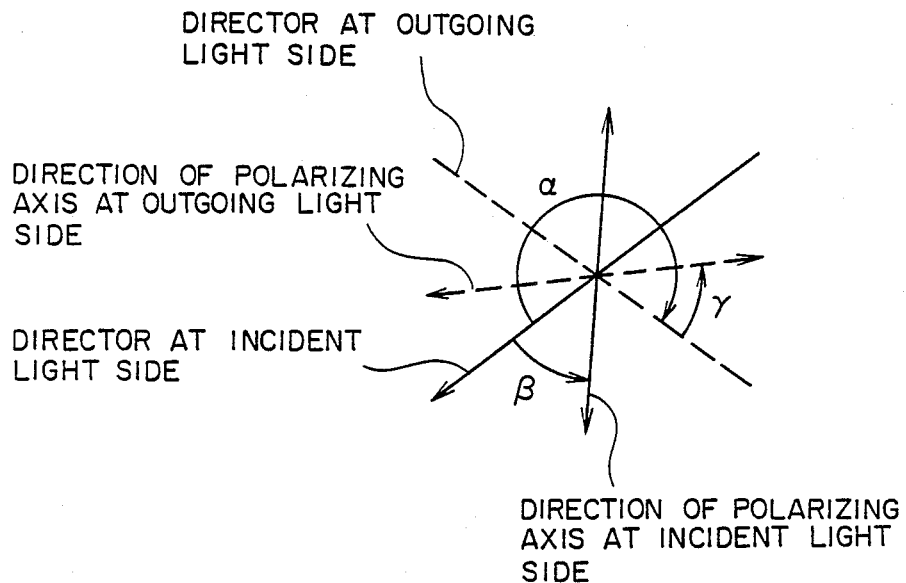

As shown in FIG. 6, when liquid crystal molecules are twisted counterclockwise toward a propagating direction of light, a clockwise direction from a director of liquid crystal molecules contacting an electrode substrate toward an alignment axis direction is taken positive as a sign of the angles $\beta$ and $\gamma$. On the other hand, as shown in FIG. 7, when liquid crystal molecules are twisted clockwise toward a propagating direction of light, a counterclockwise direction is taken positive as a sign of the angle $\beta$ and $\gamma$.

A twist angle $\alpha$ can usually be regulated by the alignment directions of the alignment layers formed on each of a pair of the electrode substrates, a nematic liquid crystal, the kind and amount of an optically active substance added thereto.

Figure 8:
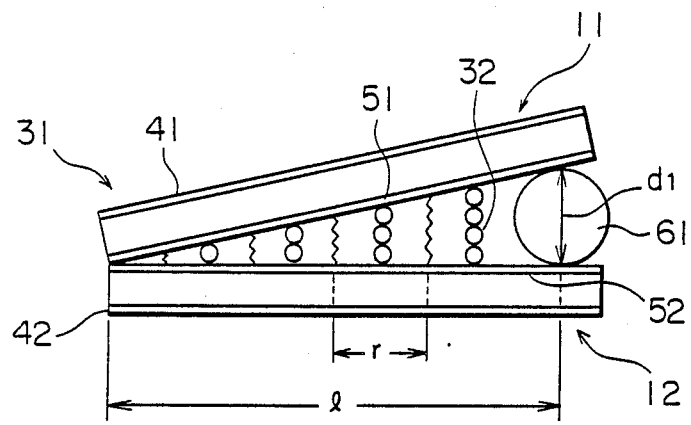
FIG. 8 is an illustration showing a method for identifying a spontaneous twist pitch Ps and FIG. 9 is an schematic cross-sectional view showing a liquid crystal display device of the invention.

The term 'spontaneous twist pitch Ps' means a twist pitch in a natural twist structure of a liquid crystal layer, which is formed by adding an optically active substance to a nematic liquid crystal. To be more concrete, as shown in FIG. 8, the electrode substrates 11 and 12 having the alignment layers 51 and 52 are oppositely disposed in a wedge shape to form a liquid crystal cell 31, and the spontaneous twist pitch can be determined from the following equation by measuring a distance r of the striped patterns (a) discrination line per ½ pitch) formed on a face of the liquid crystal cell 31 when a nematic liquid crystal 32 is sealed therein, a thickness $d_1$ of a liquid crystal layer and a length l of the liquid crystal cell 31;

Spontaneous twist pitch $Ps = 2d_1 r/l$

In the drawing, 61 is a spacer, 41 and 42 are the polarizing plates, and the aliment layers 51 and 52 are subjected to an aligning treatment in a direction parallel to each other.

A compulsive twist pitch Pc is defined by the following equation in which d represents a thickness of a liquid crystal layer of a liquid crystal display device and $\alpha$ represents a twist angle;

Compulsive twist pitch $Pc = (360°/\alpha) \times d$ $k_{33}/k_{22}$ and $k_{33}/k_{11}$ can be measured by a method described in H. Gruler et al. Z. Naturforsch, 279, (1972) 966, in which the values thereof can be determined by a threshold value of an electric capacity variation or an optical variation observed in applying a magnetic field to a uniformly aligned liquid crystal cell; another method H. Deuling, Mol. Cryst. Liq. Cryst. 19, (1972), 123, in which the values can be determined by the electric capacity variation observed in applying an electric field to a uniformly aligned liquid crystal.

There is no special limitation to the means for making an electrode substrate having an alignment layer, but any of various publicly known means can be used. In the invention, a rubbing method which is excellent for mass production can effectively be used. In particular, the following means are preferable to obtain a larger pretilt angles.

1. A means for providing an aligning treatment by a rubbing method where a layer of a high molecular substance such as a polymer of imide, amide, vinyl alcohol, phenoxy or the like each having a non-polar linear chain on a principal polymer chain or a side chain, is formed on a surface of an electrode substrate, and the surface of the layer is rubbed with a woven cloth, flocked cloth, loose-woven cloth or the like, which is made of cotton, vinylon, tetron, nylon, rayon, carbon fibre or the like.

2. Another means for providing an aligning treatment by a rubbing method where a layer of an aligning agent prepared by mixing a homogeneous aligning agent such as polyimide type, polyamide type, polyvinyl alcohol type or the like type with a homeotropic aligning agent such as a chromium carboxylate complex, an organic silane compound or the like, is formed on a surface of an electrode substrate, and the surface of the layer is rubbed.

3. A means for providing an aligning treatment by forming a LB (Langmuir-Blodgett) layer on an electrode substrate.

4. A means for providing an aligning treatment in the manner that gratingwise groove are formed in a prescribed direction by means of photolithography or anisotropic etching on a surface of an electrode substrate.

In the invention, a particularly preferable pretilt angle is not smaller than 10° and smaller than 25°.

There is no special limitation to a nematic liquid crystal, and various substances can be used. Some of the typical ones will be given below. It is, however, to be understood that the invention shall not be limited thereto. It is allowed to use any mixture of the substances.

1. Cyclohexylcarboxylate compounds represented by the following structural formula;

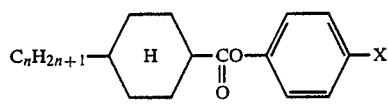

wherein X represents R which is an alkyl group having 1 to 18 carbon atoms, OR, CN, or

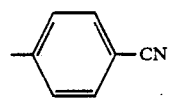

2. Biphenyl compounds represented by the following structural formula;

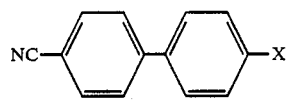

wherein X represents R, OR, or

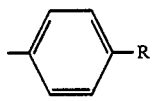

3. Phenylcyclohexane compounds represented by the following structural formula;

wherein X represents R, OR, CN, or

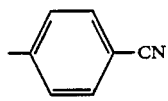

4. Pyrimidine compounds represented by the following structural formula;

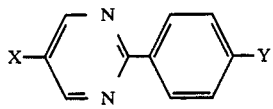

wherein X represents R, CM, or

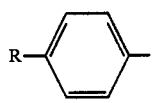

Y represents R, OR, or CN.

5. Azo—azoxy compounds represented by the following structural formula;

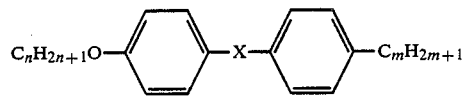

wherein X represents —N=N—, $-\underset{O}{N=N}-$, or $-N=\underset{O}{N}-$.

6. Benzoate compounds represented by the following structural formula;

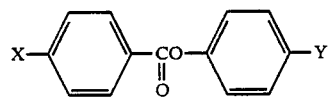

wherein X represents R, RO, or

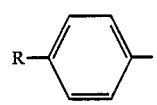

and Y represents R, OR, CN, or

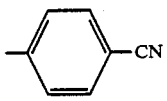

7. Tolan compounds represented by the following structural formula;

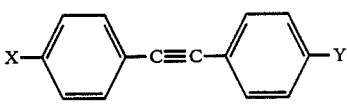

wherein X and Y represent each F, R, OR, and

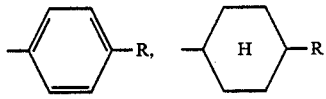

8. Ethane compounds represented by the following structural formula;

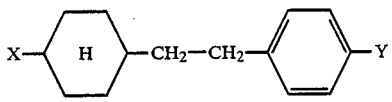

wherein X and Y represent each R, OR

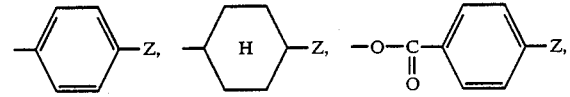

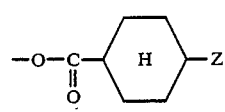

and Z represents H, F. cl, Br or R.

The nematic liquid crystals applicable to the invention are also allowed to contain, if required, a smectic crystal, a cholesteric crystal or the like.

As for an optically active substances which may be added to the nematic crystals, it is allowed to use those usually called chiral nematic liquid crystals such as a nematic liquid crystal of an ester type, a biphenyl type, a phenylcyclohexane type, an azo type or the like each having an optically active group represented by the following formula as a terminal group:

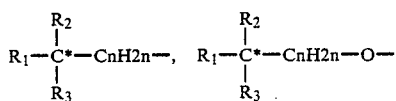

wherein $R_1$, $R_2$ and $R_3$ represent each an alkyl group or a hydrogen atom, provided that $R_1$, $R_2$ and $R_3$ are different from each other.

To be more concrete, the compounds represented by the following formula can be used.

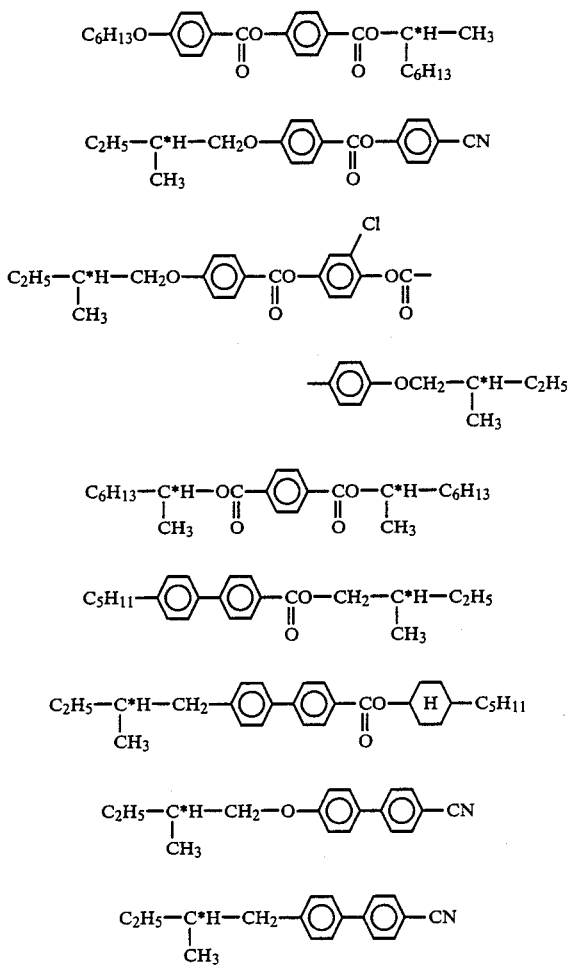

As for an optically active substance added to a nematic liquid crystal, a chiral smectic liquid crystal, a cholesteric liquid crystal or the like may be used.

The optically active substance which may be contained in a nematic liquid crystal applicable to the invention is preferably able to satisfactorily shorten a spontaneous twist pitch per unit amount added to the nematic liquid crystal. Selection of such a substance as mentioned above makes it possible to limit a required addition amount thereof to a lower level, preferably to not more than 1.5% by weight, which in turn results in minimizing a decrease of a transition temperature $T_{NI}$ from a nematic liquid crystal to an isotropic liquid, which is caused by addition of the optically active substance, and also results in diminishing a temperature dependency of the spontaneous twist pitch. In the invention, it is further allowed to combindedly use several kinds of optically active substances having the mutually reverse signs in the temperature variation coefficients of the spontaneous twist pitches.

EXAMPLES

The examples of the invention will be detailed below.

Figure 9:
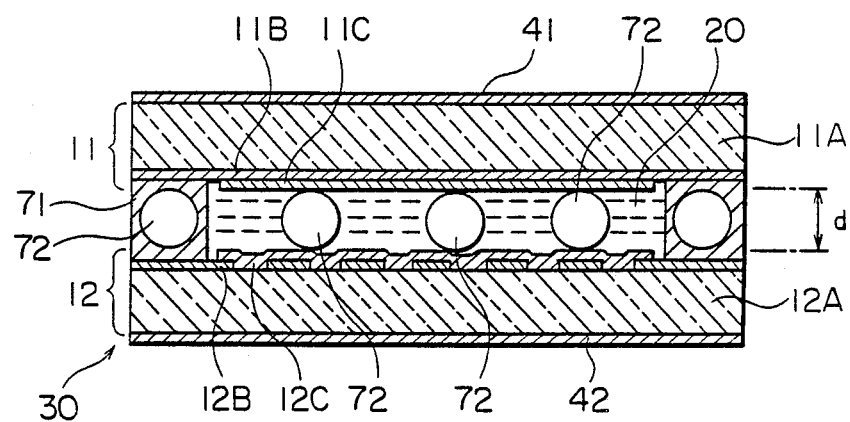

FIG. 9 is a schematic illustration showning a liquid crystal display device of the invention.

An upper electrode substrate 11 and a lower electrode substrate 12 are oppositely disposed via a space, wherein the upper electrode substrate 11 is constituted with an electrode layer 11B and an alignment layer 11C provided on an inside surface of a support plate 11A, and the lower electrode substrate 12 is constituted with an electrode layer 12B and an alignment layer 12C provided on an inside surface of a support plate 12A.

A space between the upper electrode substrate 11 and the lower electrode substrate 12 is sealed with a sealing 71 to constitute a liquid crystal cell 30. Inside the liquid crystal cell 30, are disposed separately plural spacers 72 as well as, a nematic liquid crystal with a twisted structure, which contains an optically active substance, to form a liquid crystal layer 20.

A front polarizing plate 41 and a rear polarizing plate 42 are disposed on the outer faces of the upper electrode substrate 11 and the lower electrode substrate 12, respectively.

Either electrode substrates 11 and 12 transmit light. In a word, this example is a transmittance type liquid crystal display device. In a reflection type liquid crystal display device, a reflector may be provided on an outer face of the rear polarizing plate 42.

The materials for constituting the support plates 11A and 12A include, for example, glass materials such as soda glass, borosilicate glass, quartz glass, and so forth: plastic sheets made of uniaxial oriented polyethylene terephthalate, polyether sulfone, polyvinyl alcohol, or the like; metal sheets made of aluminium, stainless steel, or the like.

Each of electrode layers 11B and 12B is constituted with a transparent electrode comprising of, for example, ITO (an oxide of tin and indium) disposed on each of the surfaces of the support plates 11A and 12A. The transparent electrode constituting one electrode layer 11B is arranged perpendicular to the transparent electrode constituting the other electrode layer 12B to constitute an electrode structure for a matrix type display.

If required, the upper and lower electrode substrates 11 and 12 may comprise an insulating layer, a dielectric layer, an anti-alkali ion migration layer, an antihalation layer, and a deflection layer.

In the invention, a light shielding layer is preferably provided on a non-picture element area, so that light leaking from the non-picture element area can be prevented, and therefore, the non-picture element can be darker to further increase a contrast. Such light shielding layer can be composed of a metal layer, a shielding layer containing black silver dispersed in an insulating binder such as gelatin, or a shielding layer containing a dyestaff or a pigment dispersed in an insulating binder.

EXAMPLES AND COMPARATIVE EXAMPLES

In each of the examples and the comparative examples, the liquid crystal display devices constituted as shown in FIG. 9 were manufactured in accordance with the conditions shown in Tables 2 through 6.

The front polarizing plate 41 and the rear polarizing plate 42 were made of 'NPF-G1220DU' manufactured by Nitto Denko Co., Ltd. The spacer 72 was made of glass fibre. The sealing member 71 was made of 'Stractbond XN-5A-C' manufactured by Mitsui Toatsu Chemicals, Inc.

Evaluation

Practical display tests were performed with the respective liquid crystal display device operated in multiplex driving at a 1/100 duty ratio to evaluate the contrasts and the degrees of an achromatism.

The degrees of an achromatism were evaluated through visual inspection of displayed images and graded to 'Good' where a clear display having almost no tinting was observed, 'Fair' where there was a slight tinting with no problem for practical use, and 'Poor' where it was not practically applicable because of a serious tinting.

The evaluation results are shown in the following Tables 2 to 6.

TABLE 2

|  | Example 1 | Example 2 | Example 3 | Comparison 1 | Comparison 2 |
|---|---|---|---|---|---|
| Twist angle $\alpha$ | 270° | 270° | 270° | 270° | 270° |
| Pretilt angle $\theta_o$ | 20° | 20° | 20° | 20° | 20° |
| $\Delta n\, d$ | 0.75 | 0.75 | 0.75 | 0.75 | 0.75 |
| Angle $\beta$ | 38° | 40° | 36° | 47° | 24° |
| Angle $\gamma$ | 52° | 50° | 54° | 43° | 66° |
| $\delta$ *: non-optimum value | 14° | 10°* | 18°* | −4°* | 42°* |
| (Pc − Ps)/Ps | −0.1 | −0.1 | −0.1 | −0.1 | −0.1 |
| Alignment layer | Rubbed polyimide film RN-066 Thickness: 1000 Å | Rubbed polyimide film RN-066 Thickness: 1000 Å | Rubbed polyimide film RN-066 Thickness: 1000 Å | Rubbed polyimide film RN-066 Thickness: 1000 Å | Rubbed polyimide film RN-066 Thickness: 1000 Å |
| Nematic liquid crystal | CR-4008 | CR-4008 | CR-4008 | CR-4008 | CR-4008 |
| $\Delta n$ | 0.15 | 0.15 | 0.15 | 0.15 | 0.15 |
| $k_{33}/k_{11}$ | 1.1 | 1.1 | 1.1 | 1.1 | 1.1 |
| $k_{33}/k_{22}$ | 2.4 | 2.4 | 2.4 | 2.4 | 2.4 |
| $\Delta\epsilon/\epsilon_\perp$ | 2.42 | 2.42 | 2.42 | 2.42 | 2.42 |
| Optically active substance | S-811 | S-811 | S-811 | S-811 | S-811 |
| Added proportion by wt % | 1.40 | 1.40 | 1.40 | 1.40 | 1.40 |
| Liquid crystal layer thickness d | 5.0 μm | 5.0 μm | 5.0 μm | 5.0 μm | 5.0 μm |
| Contrast | 54 | 33 | 26 | 6 | 4 |
| Achromatic property | Fair | Fair | Fair | Fair | Fair |

CR-4008: CHISSO CORP., RN-066: NISSAN CHEMICAL IND. CO., S-811: Chiral nematic liquid crystal, MAERCK CO.

TABLE 3

|  | Example 4 | Example 5 | Example 6 | Example 7 | Comparison 3 | Comparison 4 |
|---|---|---|---|---|---|---|
| Twist angle $\alpha$ | 270° | 270° | 270° | 270° | 270° | 270° |
| Pretilt angle $\theta_o$ | 15° | 15° | 15° | 15° | 15° | 15° |
| $\Delta n\, d$ | 0.60 | 0.70 | 0.79 | 0.85 | 0.55 | 0.90 |
| Angle $\beta$ | 36° | 36° | 35° | 35° | 36° | 35° |
| Angle $\gamma$ | 54° | 54° | 55° | 55° | 54° | 55° |
| $\delta$ | 18° | 18° | 20° | 20° | 18° | 20° |
| (Pc − Ps)/Ps | −0.05 | −0.05 | −0.05 | −0.5 | −0.5 | −0.05 |
| Alignment layer | Rubbed polyimide film RN-066 Thickness: 1000 Å | Rubbed polyimide film RN-066 Thickness: 1000 Å | Rubbed polyimide film RN-066 Thickness: 1000 Å | Rubbed polyimide film RN-066 Thickness: 1000 Å | Rubbed polyimide film RN-066 Thickness: 1000 Å | Rubbed polyimide film RN-066 Thickness: 1000 Å |
| Nematic liquid crystal | ZLI-2293 | ZLI-2293 | ZLI-2293 | ZLI-2293 | ZLI-2293 | ZLI-2293 |
| $\Delta n$ | 0.132 | 0.132 | 0.132 | 0.132 | 0.132 | 0.132 |
| $k_{33}/k_{11}$ | 1.43 | 1.43 | 1.43 | 1.43 | 1.43 | 1.43 |
| $k_{33}/k_{22}$ | 2.5 | 2.5 | 2.5 | 2.5 | 2.5 | 2.5 |
| $\Delta\epsilon/\epsilon_\perp$ | 2.43 | 2.43 | 2.43 | 2.43 | 2.43 | 2.43 |
| Optically active substance | S-811 | S-811 | S-811 | S-811 | S-811 | S-811 |
| Added proportion by wt % | 1.54 | 1.31 | 1.16 | 1.08 | 1.65 | 1.02 |
| Liquid crystal layer thickness d | 4.5 μm | 5.3 μm | 6.0 μm | 6.4 μm | 4.2 μm | 6.8 μm |
| Contrast | 25 | 46 | 58 | 53 | 15 | 35 |
| Achromatic property | Fair | Fair | Fair | Fair | Fair | Poor |
| Others | — | — | — | — | Dark | — |

ZLI-2293: MAERCK CO., RN-066: NISSAN CHEMICAL IND. CO., S-811: Chiral nematic liquid crystal, MAERCK CO.

TABLE 4

|  | Example 8 | Example 9 | Example 10 | Example 11 | Comparison 5 | Comparison 6 |
|---|---|---|---|---|---|---|
| Twist angle $\alpha$ | 220° | 240° | 260° | 300° | 200° | 320° |
| Pretilt angle $\theta_o$ | 20° | 20° | 20° | 20° | 20° | 20° |
| $\Delta n\, d$ | 0.77 | 0.77 | 0.77 | 0.77 | 0.77 | 0.77 |
| Angle $\beta$ | 63° | 54° | 44° | 25° | 68° | 15° |
| Angle $\gamma$ | 27° | 36° | 46° | 65° | 22° | 75° |
| $\delta$ | 14° | 12° | 12° | 10° | 24° | 10° |
| (Pc − Ps)/Ps | −0.05 | −0.05 | −0.05 | −0.5 | −0.5 | −0.05 |
| Alignment layer | Rubbed polyimide film RN-715 Thickness: 1000 Å | Rubbed polyimide film RN-715 Thickness: 1000 Å | Rubbed polyimide film RN-175 Thickness: 1000 Å | Rubbed polyimide film RN-715 Thickness: 1000 Å | Rubbed polyimide film RN-715 Thickness: 1000 Å | Rubbed polyimide film RN-715 Thickness: 1000 Å |
| Nematic liquid crystal | ZLI-2293 | ZLI-2293 | ZLI-2293 | ZLI-2293 | ZLI-2293 | ZLI-2293 |
| $\Delta n$ | 0.132 | 0.132 | 0.132 | 0.132 | 0.132 | 0.132 |
| $k_{33}/k_{11}$ | 1.43 | 1.43 | 1.43 | 1.43 | 1.43 | 1.43 |
| $k_{33}/k_{22}$ | 2.5 | 2.5 | 2.5 | 2.5 | 2.5 | 2.5 |
| $\Delta\epsilon/\epsilon_\perp$ | 2.43 | 2.43 | 2.43 | 2.43 | 2.43 | 2.43 |

TABLE 4-continued

|  | Example 8 | Example 9 | Example 10 | Example 11 | Comparison 5 | Comparison 6 |
|---|---|---|---|---|---|---|
| Optically active substance | S-811 | S-811 | S-811 | S-811 | S-811 | S-811 |
| Added proportion by wt % | 0.97 | 1.06 | 1.15 | 1.33 | 1.89 | 1.42 |
| Liquid crystal layer thickness d | 5.8 μm | 5.8 μm | 5.8 μm | 5.8 μm | 5.8 μm | 5.8 μm |
| Contrast | 22 | 45 | 65 | 55 | 11 | 50 |
| Archromatic property | Fair | Fair | Fair | Fair | Fair | Poor |
| Others | — | — | — | — | Dark | Slow in responce |

ZLI-2293: MAERCK CO., RN-715: NISSAN CHEMICAL IND. CO., S-811: Chiral nematic liquid crystal, MAERCK CO.

TABLE 5

|  | Example 12 | Example 13 | Example 14 | Example 14 | Example 14 |
|---|---|---|---|---|---|
| Twist angle α | 270° | 270° | 270° | 270° | 270° |
| Pretilt angle $\theta_0$ | 5° | 8° | 10° | 15° | 24° |
| Δn d | 0.77 | 0.77 | 0.77 | 0.77 | 0.77 |
| Angle β | 28° | 29° | 32° | 35° | 39° |
| Angle γ | 62° | 61° | 58° | 55° | 51° |
| δ | 34° | 32° | 26° | 20° | 12° |
| (Pc − Ps)/Ps | −0.1 | −0.08 | −0.08 | −0.05 | −0.02 |
| Alignment layer | Rubbed polyimide film RN-066 Thickness: 1000 Å | Rubbed polyimide film RN-066 Thickness: 1000 Å | Rubbed polyimide film RN-066 Thickness: 1000 Å | Rubbed polyimide film RN-066 Thickness: 1000 Å | Rubbed polyimide film RN-066 Thickness: 1000 Å |
| Nematic liquid crystal | ZLI-2293 | ZLI-2293 | ZLI-2293 | ZLI-2293 | ZLI-2293 |
| Δn | 0.132 | 0.132 | 0.132 | 0.132 | 0.132 |
| $k_{33}/k_{11}$ | 1.43 | 1.43 | 1.43 | 1.43 | 1.43 |
| $k_{33}/k_{22}$ | 2.5 | 2.5 | 2.5 | 2.5 | 2.5 |
| $\Delta\epsilon/\epsilon_\perp$ | 2.43 | 2.43 | 2.43 | 2.43 | 2.43 |
| Optically active substance | S-811 | S-811 | S-811 | S-811 | S-811 |
| Added proportion by wt % | 1.13 | 1.16 | 1.16 | 1.20 | 1.23 |
| Liquid crystal layer thickness d | 5.8 μm | 5.8 μm | 5.8 μm | 5.8 μm | 5.8 μm |
| Contrast | 21 | 23 | 28 | 54 | 83 |
| Achromatic property | Fair | Fair | Fair | Fair | Fair |

ZLI-2293: MAERCK CO., RN-066: NISSAN CHEMICAL IND. CO., S-811: Chiral nematic liquid crystal, MAERCK CO.

TABLE 6

|  | Example 17 | Example 18 | Comparison 7 | Example 19 | Example 20 | Example 21 |
|---|---|---|---|---|---|---|
| Twist angle α | 220° | 270° | 270° | 270° | 270° | 270° |
| Pretilt angle $\theta_0$ | 15° | 15° | 15° | 20° | 20° | 20° |
| Δn d | 0.75 | 0.75 | 0.75 | 0.79 | 0.77 | 0.81 |
| Angle β | 38° | 30° | 23° | 10° | 38° | 37° |
| Angle γ | 52° | 60° | 67° | 30° | 52° | 53° |
| δ | 14° | 30° | 44° | 20° | 14° | 16° |
| (Pc − Ps)/Ps | −0.15 | −0.05 | −0.05 | −0.05 | −0.05 | −0.1 |
| Alignment layer | Rubbed polyimide film RN-066 Thickness: 1000 Å | Rubbed polyimide film RN-066 Thickness: 1000 Å | Rubbed polyimide film RN-066 Thickness: 1000 Å | Rubbed polyimide film RN-066 Thickness: 1000 Å | Rubbed polyimide film RN-715 Thickness: 1000 Å | Rubbed polyimide film RN-715 Thickness: 1000 Å |
| Nematic liquid crystal | CR-4008 | CR-4008 | CR-4008 | ZLI-2293 | ZLI-3239 | ZLI-3275 |
| Δn | 0.15 | 0.15 | 0.15 | 0.132 | 0.1395 | 0.124 |
| $k_{33}/k_{11}$ | 1.1 | 1.1 | 1.1 | 1.43 | 1.49 | 1.19 |
| $k_{33}/k_{22}$ | 2.4 | 2.4 | 2.4 | 2.5 | 2.7 | 2.3 |
| $\Delta\epsilon/\epsilon_\perp$ | 2.42 | 2.42 | 2.42 | 2.43 | 2.71 | 2.32 |
| Optically active substance | S-811 | S-811 | S-811 | S-811 | S-811 | S-811 |
| Added proportion by wt % | 1.33 | 1.48 | 1.64 | 1.16 | 1.10 | 1.15 |
| Liquid crystal layer thickness d | 5.0 μm | 5.0 μm | 5.0 μm | 6.0 μm | 5.5 μm | 6.5 μm |
| Contrast | 58 | 24 | 8 | 15 | 66 | 55 |
| Achromatic property | Fair | Fair | Fair | Good | Fair | Poor |

CR-4008: CHISSO CORP., ZLI-2293, ZLI-3239, ZLI-3275: MAERCK CO., RN-066, RN-715: NISSAN CHEMICAL IND. CO., S-811: Chiral nematic liquid crystal, MAERCK CO.

Advantages of the Invention

As described above, Conditions (a) through (d) can be satisfied in accordance with the invention, so that it is possible to manufacture a liquid crystal display device with a simple structure, which can provide an excellent display having a high contrast and free of tinting in multiplex driving at a high duty ratio, while a production cost is cut down.

Further, an alignment layer can be formed, for example, by a rubbing method, because a pretilt angle $\theta_0$ is smaller than 25°, which can simplify the production process of the device.

In addition to the above, when the angle β further satisfies Equation (3), the contrast can further be upgraded.

What is claimed is:

1. A liquid crystal display device comprising a liquid crystal cell having a liquid crystal layer in which a nematic liquid crystal containing an optically active substance and forming a twisted structure is disposed between a pair of parallel electrode substrates, each of the substrates associated with a respective alignment layer located between the substrate and the liquid crystal layer and a respective polarizing plate disposed on the side of the substrate opposite the alignment layer, wherein a pretilt angle $\theta_0$ defined by the intersection of a director of the nematic liquid crystal and the electrode substrates is less than 25°, and the liquid crystal display device is characterized by satisfying the following Conditions (a) through (d);

Condition (a): a twist angle $\alpha$ of the twisted structure in the liquid crystal layer is 220° to 300°;

Condition (b): a product, $\Delta n \cdot d$, $\Delta n$ being a refractive anisotropy of the nematic liquid crystal and d being a thickness of the liquid crystal layer, is 0.60 to 0.85 $\mu m$;

Condition (c): in relation to the twist angle $\alpha$, angles $\beta$ and $\gamma$ defined by the intersection of polarizing axes of the pair of polarizing plates and the directions of aligning treatments of the electrode substrates adjacent to the respective polarizing plates, and correction angle $\delta$ satisfy Equation (1);

$$\alpha + \beta - \gamma - 180° = 90° - \delta \quad 0° < \delta < 40° \quad \text{Equation (1)}$$

Condition (d): a spontaneous twist pitch Ps of the nematic liquid crystal containing the optically active substance and a compulsive twist pitch Pc of the liquid crystal layer in which the twisted structure is forcibly regulated by the alignment layer satisfy Equation (2);

$$(Pc - Ps)/Ps < 0 \quad \text{Equation (2)}$$

2. The display device of claim 1, wherein said distortion angle $\beta$ satisfies Equation (2); Equation (2):
$\beta = (360 - \alpha)/2 - \delta/2$ 3. The display device of claim 1, wherein said pretilt angle is not less than 10° and less than 25°.

4. The display device of claim 1, wherein a splay elastic constant $k_{11}$ or a twist elastic constant $k_{22}$ and a bend elastic constant $k_{33}$ of the nematic liquid crystal satisfy at least one of Equations (4) and (5); Equation (4):
$2.3 \leq k_{33}/k_{22}$ Equation (5):
$k_{33}/k_{11} \leq 1.5$ 5. The display device of claim 1, wherein a ratio, $\Delta\epsilon/\epsilon$, of a dielectric anisotropy, $\Delta\epsilon$, of the nematic liquid crystal to a dielectric constant, $\epsilon$, in a direction perpendicular to a longitudinal axis of the liquid crystal molecules is not less than 1 8.

6. The display device of claim 1, wherein a transition temperature $T_{NI}$ of the liquid crystal converted from a nematic liquid crystal phase to an isotropic liquid phase is not lower than 90° C.

7. The display device of claim 1, wherein the refractive anisotropy, $\Delta n$, is not less than 0.10.

8. The display device of claim 1, wherein a viscosity $\eta$ of the liquid crystal at 20° C. is not more than 30 cp.

9. The display device of claim 1, wherein said product, $\Delta n \cdot d$, is 0.70 to 0.85 $\mu m$.

* * * * *